(12) United States Patent
Östlund

(10) Patent No.: US 11,776,305 B2
(45) Date of Patent: Oct. 3, 2023

(54) BIOMETRIC OPTICAL ANTISPOOFING

(71) Applicant: Fingerprint Cards AB, Gothenburg (SE)

(72) Inventor: Petter Östlund, Lund (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 16/852,131

(22) Filed: Apr. 17, 2020

(65) Prior Publication Data
US 2021/0064842 A1 Mar. 4, 2021

(30) Foreign Application Priority Data
Aug. 30, 2019 (SE) .................................... 1950988-4

(51) Int. Cl.
G06V 40/12 (2022.01)
G06V 40/13 (2022.01)

(52) U.S. Cl.
CPC ...... G06V 40/1394 (2022.01); G06V 40/1318 (2022.01)

(58) Field of Classification Search
None
See application file for complete search history.

(56) References Cited

U.S. PATENT DOCUMENTS

| 7,804,984 | B2 | 9/2010 | Sidlauskas et al. |
| 10,216,975 | B1 | 2/2019 | He et al. |
| 2002/0076089 | A1* | 6/2002 | Muramatsu ........ G06K 9/00899 382/124 |
| 2012/0298757 | A1* | 11/2012 | Kim .................. G06K 19/0718 235/487 |
| 2015/0021627 | A1* | 1/2015 | Fujita ...................... H01L 31/16 257/82 |
| 2015/0381907 | A1* | 12/2015 | Boettiger .......... H01L 27/14625 348/164 |
| 2017/0337413 | A1* | 11/2017 | Bhat .................... G06K 9/0002 |

(Continued)

FOREIGN PATENT DOCUMENTS

| CN | 109313706 A | 2/2019 |
| CN | 109564627 A | 4/2019 |

(Continued)

OTHER PUBLICATIONS

Chang, S., et al., "Fingerprint Spoof Detection by NIR Optical Analysis", chapter in book "State of the art in Biometrics", IntechOpen (2011).

(Continued)

*Primary Examiner* — Benjamin X Casarez
(74) *Attorney, Agent, or Firm* — RMCK Law Group, PLC

(57) ABSTRACT

A biometric imaging arrangement comprising: a photodetector pixel array including at least a first portion of pixels arranged to receive light transmitted from a spectral filter with a spectral transmission band and at least a second portion of pixels arranged to receive light not transmitted from the spectral filter, wherein the biometric imaging arrangement is configured to acquire an image of an object and perform user authentication at least partly based on, in the acquired image, a relationship between the intensity of light received by the first portion of pixels and the intensity of light received by the second portion of pixels.

24 Claims, 8 Drawing Sheets

(56) References Cited

U.S. PATENT DOCUMENTS

| | | | |
|---|---|---|---|
| 2018/0260602 A1* | 9/2018 | He | G06F 3/042 |
| 2018/0365467 A1 | 12/2018 | Robison et al. | |
| 2019/0019000 A1* | 1/2019 | Lee | H01L 27/14678 |
| 2019/0125221 A1* | 5/2019 | Kobayashi | G06K 9/0004 |
| 2020/0097696 A1* | 3/2020 | Yao | G06V 40/1318 |
| 2020/0097699 A1* | 3/2020 | Zeng | H01L 51/5281 |
| 2020/0193138 A1* | 6/2020 | Li | G02B 5/201 |
| 2020/0410202 A1* | 12/2020 | Lin | G06K 9/209 |
| 2021/0064899 A1* | 3/2021 | Lee | G06V 40/45 |
| 2021/0383089 A1* | 12/2021 | Ye | G06V 40/1318 |

FOREIGN PATENT DOCUMENTS

| | | |
|---|---|---|
| CN | 109934137 A | 6/2019 |
| EP | 3258419 A1 | 12/2017 |
| EP | 3933670 A1 | 1/2022 |
| WO | 2008108871 A2 | 9/2008 |
| WO | 2017076292 A1 | 5/2017 |
| WO | 2019015623 A1 | 1/2019 |

OTHER PUBLICATIONS

Munir, R., Khan, A., "An Extensive Review on Spectral Imaging in Biometric Systems: Challenges & Advancements", (May 29, 2019).
Reddy, P.V., et al., "A New Antispoofing Approach or Biometric Devices", IEEE Transactions on Biomedical Circuits and Systems, vol. 2, 328 (2008).
Swedish Search Report for SE Application No. 1950988-4 dated Mar. 2, 2020, 3 pages.
Extended European Search Report dated Aug. 2, 2022 for European Application No. 20859419.2, 6 pages.

* cited by examiner

BIOMETRIC OPTICAL ANTISPOOFING

CROSS-REFERENCE TO RELATED APPLICATIONS

This application claims priority to Swedish Patent Application No. 1950988-4, filed on Aug. 30, 2019. The disclosure of the above application is hereby incorporated by reference in its entirety.

FIELD

The present invention generally relates to a biometric imaging arrangement, to an electronic device, and to a method for authenticating a user of an electronic device.

BACKGROUND

Biometric systems are widely used as means for increasing the convenience and security of personal electronic devices, such as mobile phones etc. Fingerprint sensing systems are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

One of the problems associated with fingerprint sensors concerns so-called spoof fingers trying to mimic a live fingerprint to thereby deceive a fingerprint sensor. If fraud by the spoof finger is successful, unauthorized access to systems may undesirably be approved or unauthorized transactions may be approved which may lead to disastrous consequences.

It is therefore of interest to provide improvements with regards to preventing unauthorized access using biometric spoofs.

SUMMARY

In view of above-mentioned and other drawbacks of the prior art, it is an object of the present invention to provide a biometric imaging arrangement with improved anti-spoofing capability that may be implemented in a cost-efficient way.

According to a first aspect of the invention, there is provided a biometric imaging arrangement comprising: a photodetector pixel array including at least a first portion of pixels arranged to receive light transmitted from a spectral filter with a spectral transmission band and at least a second portion of pixels arranged to receive light not transmitted from the spectral filter, wherein the biometric imaging arrangement is configured to acquire an image of an object and perform user authentication at least partly based on, in the acquired image, a relationship between the intensity of light received by the first portion of pixels and the intensity of light received by the second portion of pixel.

The present invention is based on the realization that a live finger reflects light differently than the material of typical spoof in some wavelength bands. The inventors realized that by comparing the intensity of light received by pixels that are receiving filtered light to the intensity of light received by pixels that are receiving light that is unfiltered, or possibly filtered in a different way, it may be concluded whether the imaged object is a spoof or a live biometric object. For example, a spoof made from paper, e.g. a fingerprint printed on paper, reflects visible light uniformly over the visible wavelengths compared to a finger which reflects more red light than blue light.

By means of the claimed invention, optical anti-spoofing can be implemented in a cost-efficient way without adding additional components. Instead, an already present optical filter of biometric imaging arrangements may be removed from a portion of the pixels in the array. For example, biometric sensors often include infra-red cut-off filters for removing IR-light that is transmitted through the finger to reach the pixel array. The infra-red cut-off filters may be removed from a portion of the pixels such that the intensity of light received by a portion of pixels covered with the infra-red cut-off filter can be compared to the intensity of light received by a portion of pixels not covered with the infra-red cut-off filter.

Accordingly, the biometric imaging arrangement may be configured to conclude whether an object in the image is a spoof biometric object or a live biometric object based on the relationship between the light intensities.

According to embodiments, the spectral filter may be located on a support structure which spatially separates the spectral filter from the photodetector pixel array. Thus, the spectral filter may advantageously be arranged on a structure separate from the photodetector pixel array. This facilitates manufacturing since only a single filter may be produced in which one or several parts of the filter is removed or omitted during manufacturing for allowing an opening in the filter associated with the second portion of pixels. The support structure may be a component of an optical stack up arranged on the photodetector pixel array, such as a transparent substrate arranged to cover the photodetector pixel array, or any intermediate layer arranged between e.g. a display panel and the photodetector pixel array.

Accordingly, in some embodiments, a single spectral filter may be arranged to filter light received by a plurality of pixels, wherein the second portion of pixels are not arranged to receive light filtered by the single spectral filter. Thus, with this embodiment, only a single filter is needed which provides for a manufacturing-efficient and cost-efficient implementation.

Preferably, the spectral filter includes an opening, wherein the second portion of pixels are arranged to receive light passing through the opening.

In some embodiments, the spectral filter may include multiple openings, and thereby further portions of pixels are arranged to receive light passing through a respective opening, wherein the biometric imaging arrangement may be configured to perform user authentication at least partly based on, in the acquired image, a relationship between the intensity of light received by the first portion of pixels and the intensity of light received by at least one of the portions of pixels that are arranged to receive light passing through the openings. In this way, multiple relationships between intensities may be used for improving the accuracy of the spoof detection and liveness testing. In one possible implementation, the further portions of pixels may be selected randomly thereby making the test more difficult to spoof. The biometric imaging arrangement may be configured to perform user authentication at least partly based on, in the acquired image, a relationship between the intensity of light received by the first portion of pixels and the intensity of light received by more than one of the portions of pixels that are arranged to receive light passing through the openings.

More than one may be all of the portions of pixels that are arranged to receive light passing through the openings or a sub-set, such as two, of the portions of pixels.

Further, the biometric imaging arrangement may be configured to perform user authentication at least partly based on, spatial differences in the relationships between the intensity of light received by the first portion of pixels and the intensity of light received by portions of pixels that are arranged to receive light passing through the openings.

In some embodiments, the second portion of pixels may be arranged to receive light that has not passed through a spectral filter.

According to some embodiments, the biometric imaging arrangement may be configured to acquire more than one image and to perform user authentication at least partly based on a time evolution of the relationship between the intensity of light received by the first portion of pixels and the intensity of light received by the second portion of pixels. This is yet another way to further improve the reliability of the liveness test. In a spoof made from e.g. paper or plastic, the time evolution should indicate a relatively static relationship, whereas a live finger usually changes its transmittivity to light depending on the blood flow and oxygenation.

Further, the spectral transmission band may exclude at least part of the infrared spectral band. This is an advantageous implementation since most biometric sensors include infra-red cut-off filters. Thus, by removing part of the already present filters, a relationship between intensities may be obtained and analyzed as part of the user authentication.

Another possible embodiment is that a further filter is included that at least partly, or fully, blocks visible light over the second portion of pixels.

According to embodiments, the biometric imaging arrangement may be configured to control a color controllable light source to emit light in at least one predetermined spectral band during acquisition of the image. By illuminating the object to be imaged with light in a predetermined spectral band it is possible to enhance the difference between the light detected by the first portion of pixels and the second portion of pixels.

For example, the at least one predetermined spectral band may include at least part of a spectral band rejected by the spectral filter. Thus, the second portion pixels may receive a higher intensity of light in the predetermined spectral band compared to when the color controllable light source does not emit light in the predetermined spectral band. At the same time, the filter filters out the light in the predetermined spectral band, and thus the first portion of pixels does not receive a significantly higher intensity of light in the predetermined spectral band. The contrast between the light received by the first and second portion of filters is thus enhanced.

In embodiments, the biometric imaging arrangement may be configured to be arranged under an at least partially transparent display panel and configured to capture an image of an object located on an opposite side of the at least partially transparent display panel.

The outer surface of a display panel under which the biometric imaging arrangement may be arranged may also be referred to as a sensing surface. The operating principle of an example biometric imaging arrangement may be that light emitted by pixels in the display panel will be reflected by a finger placed on the sensing surface, and the reflected light is received by light redirecting elements such as microlenses, and subsequently redirected onto a corresponding subarray of pixels or a single pixel in the photodetector pixel array. In case of a subarray, an image of a portion of a finger can be captured for each subarray. By combining the images from all of or at least some of the light redirecting elements, an image representing the fingerprint can be formed and subsequent biometric verification can be performed.

According to embodiments, the transparent display panel may comprise the color controllable light source. Various types of displays can be used in accordance with embodiments. For example, display panels based on OLED, u-LED with any type of tri-stimulus emission like RGB, CMY or others.

The relationship between the intensities may be selected depending on specific implementations. In one example embodiment, the relationship between the intensity of light received by the first portion of pixels and the intensity of light received by the second portion of pixel is a ratio.

According to a second aspect of the invention, there is provided an electronic device comprising an at least partly transparent display panel; the biometric imaging arrangement according to embodiments described herein, and processing circuitry configured to: receive a signal from the biometric imaging arrangement indicative of a fingerprint of a finger touching the transparent display panel, perform a fingerprint authentication procedure based on the detected fingerprint.

The electronic device may be e.g. a mobile device such as a mobile phone (e.g. Smart Phone), a tablet, a phablet, smart watch, etc.

Further effects and features of the second aspect of the invention are largely analogous to those described above in connection with the first aspect of the invention.

According to a third aspect of the invention, there is provided a method for authenticating a user of an electronic device including a biometric imaging arrangement having a photodetector pixel array including at least a first portion of pixels arranged to receive light transmitted from a spectral filter with a spectral transmission band and at least a second portion of pixels arranged to receive light not transmitted from the spectral filter, the method comprising: acquiring, using the optical fingerprint sensor, an image of an object, and performing user authentication at least partly based on a relationship between the intensity of light received by the first portion of pixels and the intensity of light received by the second portion of pixels.

The relationship is a ratio between the intensity of light received by the first portion of pixels and the intensity of light received by the second portion of pixel. The ratio may be compared to a threshold value to conclude whether an object in the image is a spoof biometric object or a live biometric object.

In embodiments, Illuminating the object with light in at least one predetermined spectral band during acquisition of the image.

Further effects and features of the third aspect of the invention are largely analogous to those described above in connection with the first aspect and the second aspect of the invention.

According to a fourth aspect of the invention, there is provided a control unit configured to perform the steps of any one of the embodiments of the third aspect of the invention.

A control unit for performing authentication of a user of an electronic device including a biometric imaging arrangement having a photodetector pixel array including at least a first portion of pixels arranged to receive light transmitted from a spectral filter with a spectral transmission band and at least a second portion of pixels arranged to receive light not transmitted from the spectral filter, the control unit is configured to obtain an image of an object, and to perform user authentication at least partly based on a relationship between the intensity of light received by the first portion of pixels and the intensity of light received by the second portion of pixels.

Further effects and features of the fourth aspect of the invention are largely analogous to those described above in connection with the first aspect, the second aspect, and the third aspect of the invention.

According to a fifth aspect of the invention, there is provided a computer program product comprising a computer readable medium having stored thereon computer program means for authenticating a user of an electronic device including a biometric imaging arrangement having a photodetector pixel array including at least a first portion of pixels arranged to receive light transmitted from a spectral filter with a spectral transmission band and at least a second portion of pixels arranged to receive light not transmitted from the spectral filter, wherein the computer program product comprises: code for analyzing a relationship between the intensity of light received by the first portion of pixels and the intensity of light received by the second portion of pixel, in an image of an object acquired by the biometric imaging arrangement, and code for performing user authentication at least partly based on the relationship.

Further effects and features of the fifth aspect of the invention are largely analogous to those described above in connection with the first aspect, the second aspect, the third aspect, and the fourth aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the biometric imaging arrangement according to the present invention are mainly described with reference to a biometric imaging arrangement arranged under a display panel. However, it should be noted that the described imaging device also may be used in other optical fingerprint imaging applications such as in an optical fingerprint sensor located under a cover glass or the like.

Figure 1A:
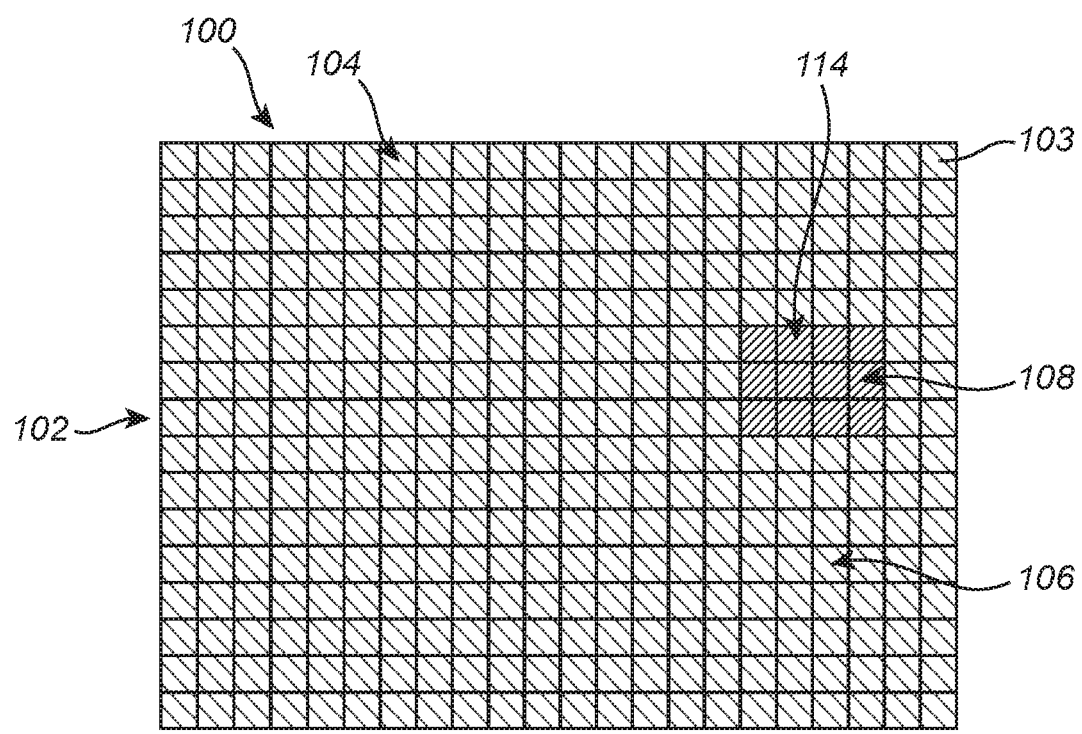
FIG. 1A conceptually illustrates a top-view of a biometric imaging arrangement according to embodiments of the invention.
Figure 1B:
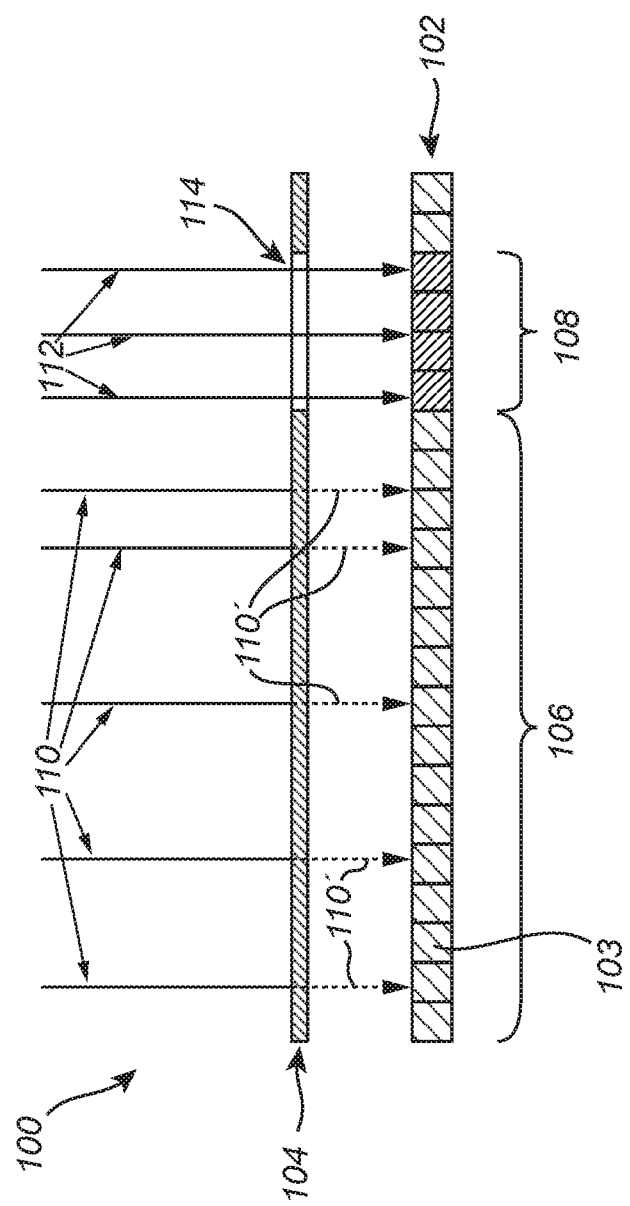
FIG. 1B illustrates a cross-section of the conceptual biometric imaging arrangement in FIG. 1A.

FIG. 1A conceptually illustrates a top-view of a biometric imaging arrangement 100 comprising a photodetector pixel array 102 which includes a plurality of pixels 103 of which only one is numbered. The photodetector pixel array 102 receives light which has either been filtered through a filter 104, or that has not been filtered by the filter 104. More precisely, the photodetector pixel array 102 includes at least a first portion of pixels 106 arranged to receive light transmitted from the spectral filter 104 with a spectral transmission band, and at least a second portion of pixels 108 arranged to receive light not transmitted from the spectral filter. Thus, the second portion of pixels 108 is arranged to not receive light filtered by the spectral filter 104. Accordingly, the spectral composition of the light received by the first portion of pixels 106 will be different from the spectral composition of the light received by the second portion of pixels 108. As conceptually illustrated in FIG. 1B, showing a cross-section of the biometric imaging arrangement 100, the light beams 110 that reach the filter 104 are filtered before the filtered counterparts 110' reach the first portion of pixels 106. In contrast, the light beams 112 are not filtered by the filter 104 and may reach the second portion of pixels 108 unfiltered. In some possible implementations may the light that reaches the second portion 108 of pixels be filtered by a second filter with a different spectral transmission band than the first filter 104. Thus, the herein depicted opening 114 in the filter 104 may be covered with the second filter. However, in the depicted embodiment, the spectral filter 104 includes an opening 114, and the second portion of pixels 108 are arranged to receive light passing through the opening 114. In some embodiments the second portion 108 of pixels may be arranged to receive light that has not passed through a spectral filter.

FIG. 1B illustrates a gap between the filter 104 and the pixel array 102. However, the embodiments herein work equally well with the filter 104 directly on top of the pixel array, or with a separation between the filter and the pixel array 102. Thus, the filter 104 may be attached directly on the photodetector pixel array 104, but the filter 104 is preferably arranged spaced apart from the photodetector pixel array 104. As will be described with reference to subsequent drawings, the spectral filter may be located on a support structure which spatially separates the spectral filter 104 from the photodetector pixel array 102.

The biometric imaging arrangement 100 is configured to acquire an image of an object and perform user authentication at least partly based on, in the acquired image, a relationship between the intensity of light received by the first portion 106 of pixels and the intensity of light received by the second portion 108 of pixels.

The area of the opening 114 in the spectral filter 104 is smaller than the remaining filter area. Preferably, the area of the filter opening is such that the second portion of pixels is at least two pixels or preferably more than two pixels. For example, the second portion of pixels may include 5 or more pixels, e.g. 10 or 20 pixels. The number of pixels of the second portion may be about 10% of the total number of pixels in the pixel array.

The ability for a surface to reflect radiation depends at least partly on the material of material. For example, some materials absorb more energy in some wavelength bands than other materials, e.g. they have different absorption spectrum. It was thus realized that with prior knowledge of the reflection properties of a live finger, and therefore also the relationship between the intensities between differently filtered light, or between filtered and unfiltered light, received from a live object, the relationship may be compared to a presently established relationship to thereby conclude whether or not the object is a live object. Thus, the relationship between the intensity of light received by the first portion of pixels and the intensity of light received by the second portion of pixels is used in the user authentication procedure as a liveness-test. In one preferred embodiment, the relationship between the intensity of light received by the first portion of pixels and the intensity of light received by the second portion of pixel is a ratio. By using a ratio, the uncertainties in the absolute numbers are advantageously eliminated.

Accordingly, the biometric imaging arrangement may be configured to conclude whether the object in the image is a spoof biometric object or a live biometric object based on the relationship. For example, the arrangement may be provided with off-line trained upper and lower thresholds for the ratio. Thus, if the ratio falls below the lower thresholds or above the upper threshold, a conclusion may be drawn that the object is a spoof, or at least not a live finger. The threshold values may be stored in a memory device available to a control unit associated with the biometric imaging arrangement.

In some embodiments, the biometric imaging arrangement 100 may be configured to acquire more than one image and to perform user authentication at least partly based on a time evolution of the relationship between the intensity of light received by the first portion 106 of pixels and the intensity of light received by the second portion 108 of pixels. For example, a live material absorbs light in a more dynamic way compared to typical spoof materials such as paper, rubber, plastic, etc.

The biometric imaging arrangement may be calibrated using a live object to thereby teach the biometric imaging arrangement the relationship between the intensity of light received by the first portion of pixels and the intensity of light received by the second portion of pixels, in the case of a live finger. This calibration may be used in subsequent user authentication procedures.

The spectral transmission band of the filter 104 may be in various wavelength ranges. In one advantageous embodiment, the spectral transmission band of the filter excludes at least part of the infrared spectral band. Accordingly, the filter 104 may filter out at least part of the incoming infrared light, including near infrared light.

In one preferred embodiment, the spectral filter 104 is an infrared cut-off filter. This is particularly advantageous since infrared cut-off filters are commonly used for optical sensors. Thus, the implementation of embodiments of the present disclosure is simplified since it only requires removal of a part of the already present filter. Thus, no additional components are needed which thereby leads to a cost-efficient spoof detection/liveness test solution without packaging issues.

Figure 2:
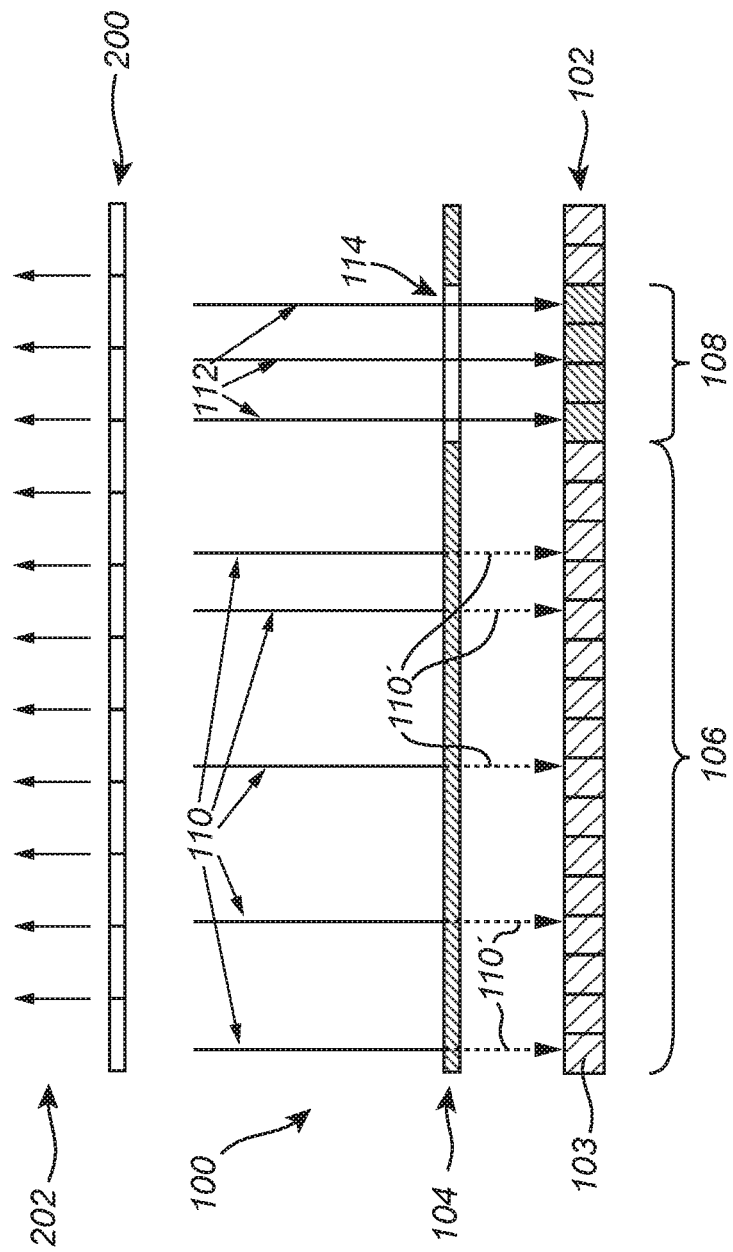
FIG. 2 conceptually illustrates a top-view of a biometric imaging arrangement according to embodiments of the invention.

FIG. 2 illustrates a possible embodiment of the present disclosure. Here, the biometric imaging arrangement 100 is configured to control a color controllable light source 200 to emit light 202 in at least one predetermined spectral band during acquisition of the image. The emitted light 202 is transmitted towards the object to be imaged, whereby the emitted light 202 is reflected by the object. Thus, by emitting light in appropriately chosen spectral bands, the relationship between light received by the first portion 106 of pixels, via the spectral filter 104, and light received by the first portion 106 of pixels, not via the spectral filter 104, may be changed. For example, the difference between the intensities of light received by the two portions, 106, 108 of pixels may be enhanced. In this way may spoof biometric objects be more easily detected. The light 202 emitted by the color controllable light source may be in at least one predetermined spectral band including at least one of blue light, and red light, and green light, and infrared light. Preferably, the at least one predetermined spectral band of the emitted light may include at least part of a spectral band rejected by the spectral filter. For example, if the filter is an infrared cut-off filter, then the emitted light may preferably include e.g. infrared or near-infrared light.

Thus, in embodiments, the color controllable light source 200 is controllable to emit light with predetermined light intensity and/or spectral composition. The user authentication is further based on the predetermined light intensity and/or spectral composition that was used for establishing the relationship. For example, the relationship between light received by the first portion 106 and the second portion 108 of pixels may be associated with the specific setting of light intensity and/or spectral composition used, whereby this setting may be used as a further level of security, e.g. the setting used when running a test must match the setting used for a reference relationship, such as thresholds determined e.g. offline.

Figure 3A:
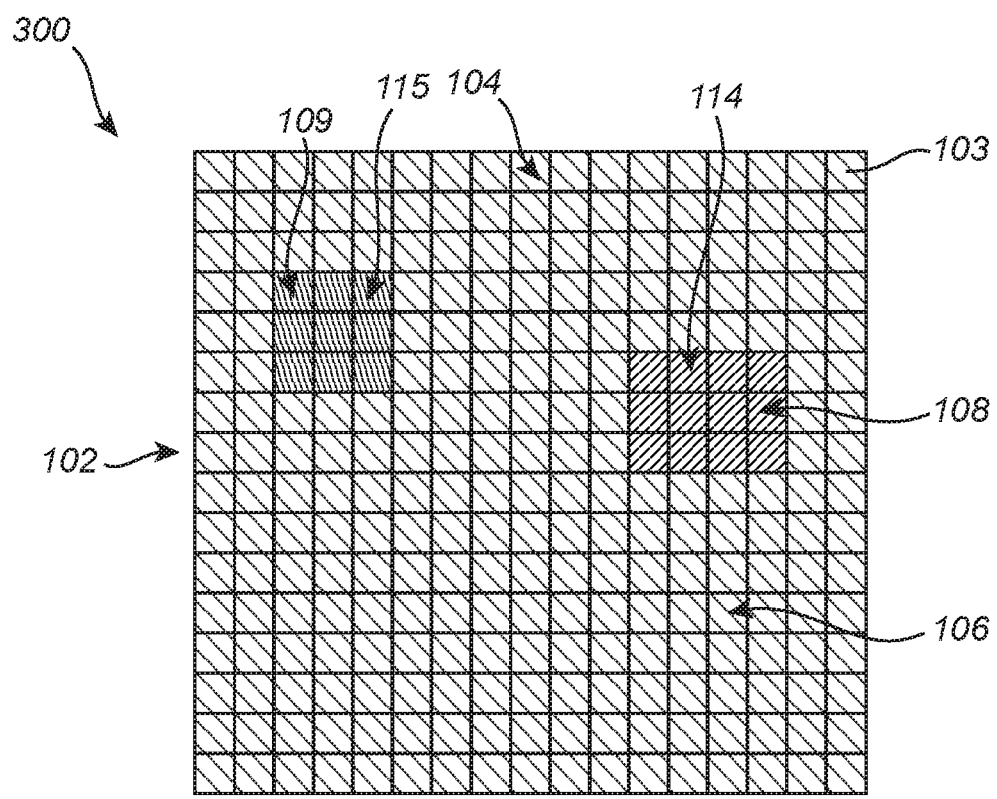
FIG. 3A conceptually illustrates a top-view of a biometric imaging arrangement according to embodiments of the invention.
Figure 3B:
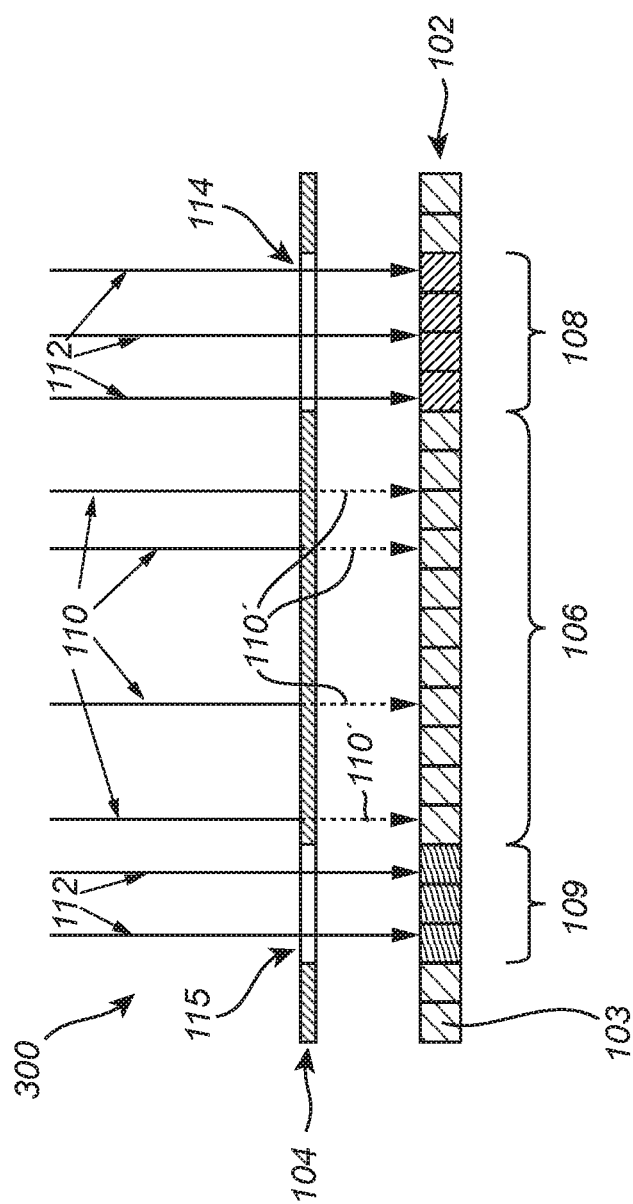
FIG. 3B illustrates a cross-section of the conceptual biometric imaging arrangement in FIG. 1A.

FIG. 3A conceptually illustrates a top-view of a biometric imaging arrangement 300 according to embodiments and FIG. 3B is a cross-section of the biometric imaging arrangement 300. The biometric imaging arrangement 300 comprises the photodetector pixel array 102, and the spectral filter 104. However, contrary to the embodiment in FIG. 1A, the spectral filter 104 here includes a further opening 115, and thereby a further portion 109 of pixels are arranged to receive light passing through the respective opening. Thereby, the biometric imaging arrangement is configured to perform user authentication at least partly based on, in the acquired image, a relationship between the intensity of light received by the first portion 106 of pixels and the intensity of light received by the portions 108 and 109 of pixels that are arranged to receive light passing through the openings 114, 115. For example, the biometric imaging arrangement may be configured to perform user authentication at least partly based on, spatial differences in the relationships between the intensity of light received by the first portion of pixels and the intensity of light received by portions of pixels that are arranged to receive light passing through the openings.

The spatial differences in the relationship may relate to the difference between two or more relationships established with two or more spatially separated portions of pixels arranged to receive light that has not passed through the spectral filter. The two or more relationships may be compared to each other for performing improved liveness test. For example, the difference between relationships may be different for live biological material such as provided by a finger compared to the difference between relationships for typical spoof materials such as paper, rubber, plastic, etc.

Figure 4:
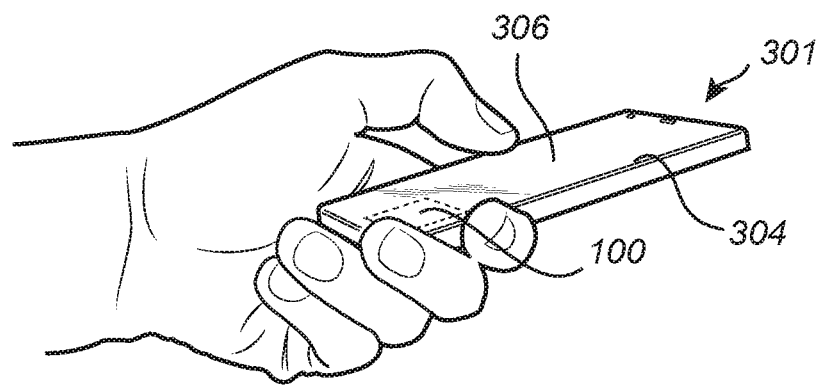
FIG. 4 schematically illustrates an example of an electronic device according to embodiments of the invention.

Turning now to FIG. 4, there is schematically illustrated an example of an electronic device configured to apply the concept according to the present disclosure, in the form of a mobile device 301 with an integrated in-display biometric imaging device 100 and a display panel 304 with a touch screen interface 306. The biometric imaging device 100 may, for example, be used for unlocking the mobile device 301 and/or for authorizing transactions carried out using the mobile device 301, etc. Furthermore, the biometric imaging device 100 may further be used for gesture recognition performed by a user for controlling action on the electronic device.

Preferably and as is apparent for the skilled person, the mobile device 301 shown in FIG. 4 further comprises a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

The biometric imaging arrangement 100 is here shown to be relatively small, a so-called hot-zone implementation. However, the biometric imaging arrangement may equally well be almost the same size as the display panel 304, e.g. a large area implementation, or in other possible implementations the same size as the display panel 304, i.e. a full display solution. Thus, in such case the user may place his/her finger anywhere on the display panel for biometric authentication. Embodiments shown herein are possible to implement in in-display imaging devices.

It should furthermore be noted that the invention may be applicable in relation to any other type of electronic devices comprising transparent display panels, such as a laptop, a tablet computer, etc.

Figure 5:
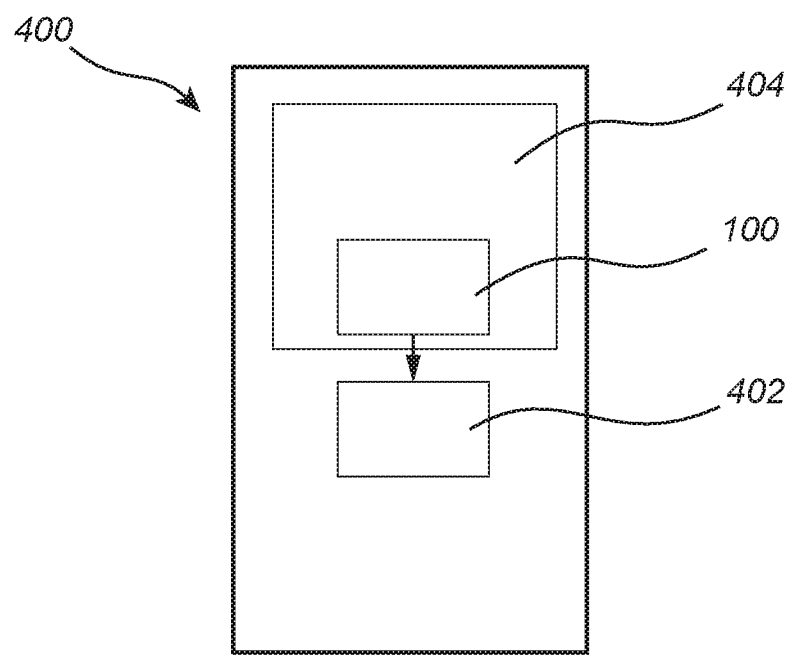
FIG. 5 is a schematic box diagram of an electronic device according to embodiments of the invention.

FIG. 5 is a schematic box diagram of an electronic device according to embodiments of the invention. The electronic device 400 comprises a transparent display panel 404 and a biometric imaging arrangement 100 conceptually illustrated to be arranged under the transparent display panel 404 according to embodiments of the invention. Furthermore, the electronic device 400 comprises processing circuitry such as control unit 402. The control unit 402 may be stand-alone control unit of the electronic device 402, e.g. a device controller. Alternatively, the control unit 402 may be comprised in the biometric imaging arrangement 100.

The control unit 402 is configured to receive a signal indicative of a detected object from the biometric imaging arrangement 100. The received signal may comprise image data.

Based on the received signal the control unit 402 is configured to detect a fingerprint, and based on the detected fingerprint the control unit 402 is configured to perform a fingerprint authentication procedure for identifying the user. Such fingerprint authentication procedures are considered per se known to the skilled person and will not be described further herein. Further, the control unit is configured to, based on the obtained image of an object, to perform user authentication at least partly based on a relationship between the intensity of light received by the first portion of pixels and the intensity of light received by the second portion of pixels. The control unit 402 may be configured to conclude whether the object in the image is a spoof biometric object or a live biometric object based on the relationship.

Figure 6:
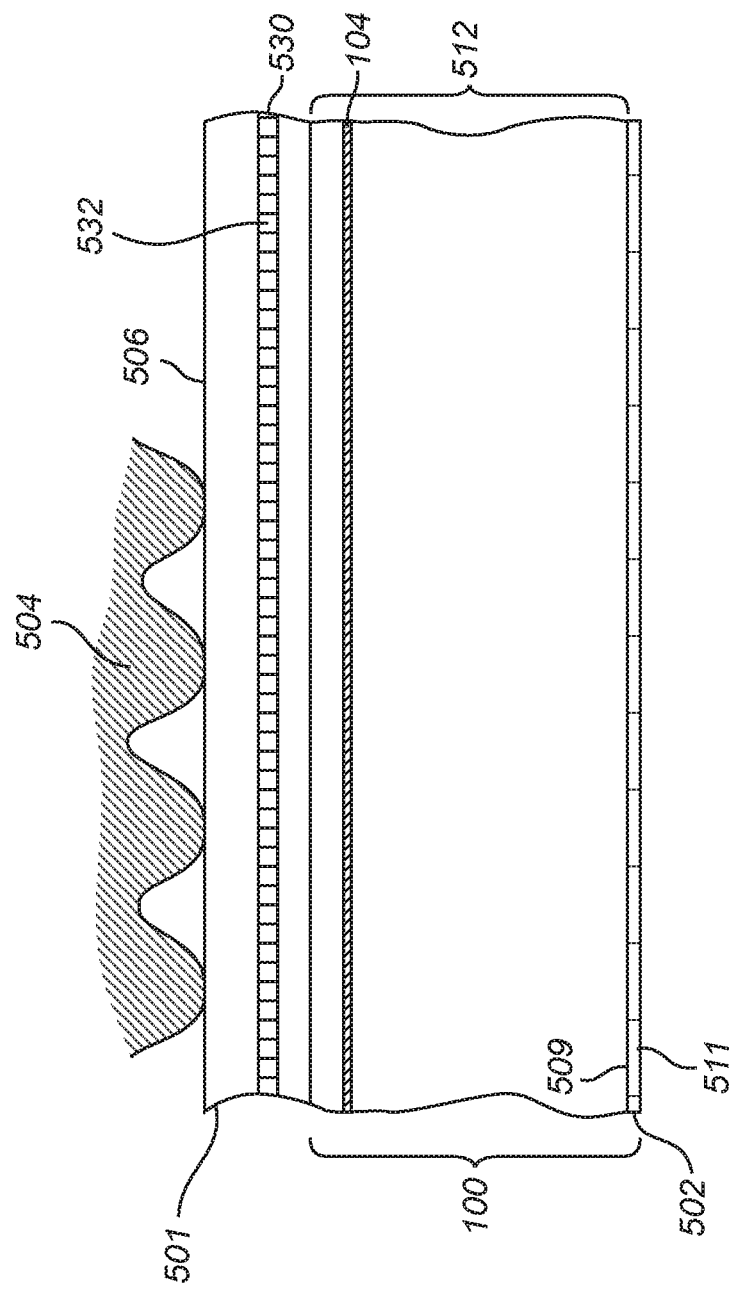
FIG. 6 schematically illustrates a biometric imaging arrangement according to an embodiment of the invention.

FIG. 6 schematically illustrates a biometric imaging arrangement 100 according to an embodiment of the invention. The biometric imaging arrangement 100 is here arranged under an at least partially transparent display panel 501. However, the biometric imaging arrangement 100 may be arranged under any cover structure which is sufficiently transparent, as long as the image sensor 502 receives a sufficient amount of light to capture an image of a biometric object in contact with the outer surface of the cover structure, such as a fingerprint or a palm print. In the following, a biometric imaging arrangement 100 configured to capture an image of a finger 504 in contact with an outer surface 506 of the display panel 502 is described.

The biometric imaging arrangement 100 comprises an image sensor 502 including a photodetector pixel array 509, where each pixel 511 is an individually controllable photodetector configured to detect an amount of incoming light and to generate an electric signal indicative of the light received by the detector. The image sensor 502 may be any suitable type of image sensor, such as a CMOS or CCD sensor connected to associated control circuitry. In one possible implementation the image sensor 502 is a thin-film transistor (TFT) based image sensor which provides a cost-efficient solution. The operation and control of such image sensors can be assumed to be known and will not be discussed herein.

The biometric imaging arrangement 100 further comprises an optical stack 512 arranged to cover the image sensor 502. The optical stack 512 may include various layers and components such as a transparent substrate covering the image sensor 502 a set of optical redirection elements such as collimators or microlenses, opaque layers having of separate openings for the optical redirection elements, an adhesive layer to attach the display panel 502 to the biometric imaging arrangement 100, air gaps, and antireflection coatings.

Moreover, the transparent display panel 502 comprises a color controllable light source 530 comprising individually controllable light emitting pixels 532. For acquiring an image of e.g. a fingerprint or palmprint, the color controllable light source 530 may emit light that is reflected by the finger 504 and detected by the pixels of the image sensor 502.

The color controllable light source 530 may emit light in predetermined spectral bands as discussed above.

There are suitable openings or optical paths past the color controllable light source 530 so that the light beams being transmitted from the finger 504 to reach the image sensor 502.

In other possible implementations a color controllable light source may be arranged on the side of the transparent panel wherein light guides or a cover glass are configured to guide light from the color controllable light source to the image sensor area for the detection of a fingerprint.

Preferably, the spectral filter 104 is arranged in the optical stack 512 separated from the image sensor 502. Thus, a structure in the optical stack 512 may serve as a support structure for the spectral filter 104. For example, the spectral filter 104 may be arranged such that any optical redirection elements such as collimators or microlenses are located in-between the spectral filter 104 and the image sensor 502. The spectral filter 104 may for example be made on a transparent substrate in the optical stack arranged directly below the display panel 502. As described above, the spectral filter 104 is arranged such that at least a first portion of pixels receives light transmitted from the spectral filter 104 with the spectral transmission band, and at least a second portion receives light not transmitted from the spectral filter 104.

Figure 7:
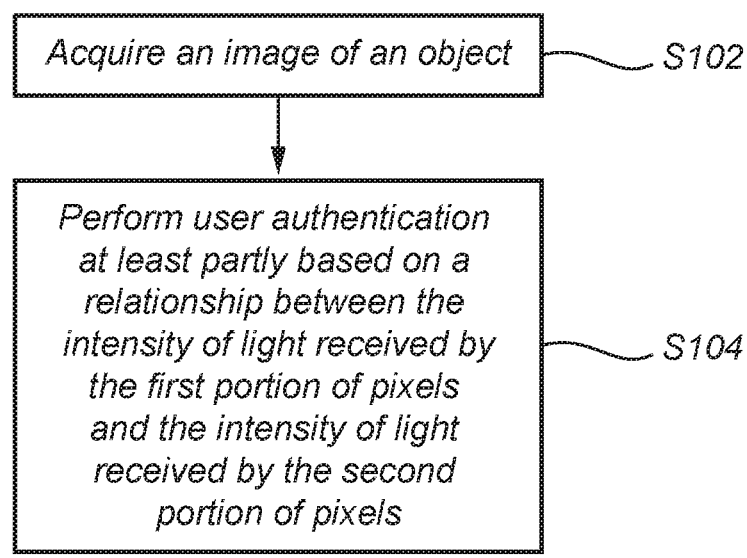
FIG. 7 is a flow-chart of method steps according to embodiments of the invention.

FIG. 7 is a flow-chart of method steps according to embodiments of the present disclosure. The method is method for authenticating a user of an electronic device including a biometric imaging arrangement having a photodetector pixel array. The array includes at least a first portion of pixels arranged to receive light transmitted from a spectral filter with a spectral transmission band and at least a second portion of pixels arranged to receive light not transmitted from the spectral filter. The method comprising a step S102 including, acquiring, using the biometric imaging arrangement, an image of an object. In step S104, performing user authentication at least partly based on a relationship between the intensity of light received by the first portion of pixels and the intensity of light received by the second portion of pixels.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the biometric imaging arrangement.

Even though the invention has been described with reference to specific exemplifying embodiments thereof, many different alterations, modifications and the like will become apparent for those skilled in the art. Also, it should be noted that parts of the imaging device and method for manufacturing the imaging device may be omitted, interchanged or arranged in various ways, the imaging device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A biometric imaging arrangement comprising:
 a photodetector pixel array including at least a first portion of pixels arranged to receive light transmitted from an infrared cut-off filter with a spectral transmission band including the entire range of visible light and at least a second portion of pixels arranged to receive light transmitted through at least one opening in the infrared cut-off filter, the light received by the second portion of pixels including visible light,
 wherein the biometric imaging arrangement is configured to acquire more than one image of an object during illumination of the object with visible light, perform user authentication at least partly based on, in the acquired images, an outcome of a time evolution of a comparison between an intensity of visible light received by the first portion of pixels and an intensity of visible light received by the second portion of pixels in the acquired images, and conclude whether the object in the images is a spoof biometric object or a live biometric object based on the time evolution of the comparison.

2. The biometric imaging arrangement according to claim 1, wherein the infrared cut-off filter is located on a support structure which spatially separates the infrared cut-off filter from the photodetector pixel array.

3. The biometric imaging arrangement according to claim 1, wherein a single infrared cut-off filter is arranged to filter light received by a plurality of pixels, wherein the second portion of pixels are arranged to not receive light filtered by the infrared cut-off filter.

4. The biometric imaging arrangement according to claim 1, wherein the infrared cut-off filter includes multiple openings, and thereby further portions of pixels arranged to receive light passing through a respective opening,
 wherein the biometric imaging arrangement is configured to perform user authentication at least partly based on, in the acquired images, an outcome of a time evolution of a comparison between the intensity of light received by the first portion of pixels and the intensity of light received by at least one of the portions of pixels that are arranged to receive light passing through the openings.

5. The biometric imaging arrangement according to claim 4, wherein the biometric imaging arrangement is configured to perform user authentication at least partly based on, spatial differences in the comparison between the intensity of light received by the first portion of pixels and the intensity of light received by portions of pixels that are arranged to receive light passing through the openings.

6. The biometric imaging arrangement according to claim 1, wherein the second portion of pixels are arranged to receive light that has not passed through a spectral filter.

7. The biometric imaging arrangement according to claim 1, wherein the biometric imaging arrangement is configured to control a color controllable light source to emit light in at least one predetermined spectral band during acquisition of the images.

8. The biometric imaging arrangement according to claim 7, wherein the at least one predetermined spectral band include at least one of blue light, and red light, and green light, and infrared light.

9. The biometric imaging arrangement according to claim 7, wherein the at least one predetermined spectral band includes at least part of a spectral band rejected by the infrared cut-off filter.

10. The biometric imaging arrangement according to claim 7, wherein the color controllable light source is controllable to emit light with predetermined light intensity and/or spectral composition, wherein the user authentication is further based on the predetermined light intensity and/or spectral composition.

11. The biometric imaging arrangement according to claim 1 configured to be arranged under an at least partially transparent display panel and configured to capture an image of an object located on an opposite side of the at least partially transparent display panel.

12. The biometric imaging arrangement according to claim 11 wherein the transparent display panel comprises a color controllable light source.

13. The biometric imaging arrangement according to claim 1, wherein the comparison between the intensity of light received by the first portion of pixels and the intensity of light received by the second portion of pixels is a ratio.

14. An electronic device comprising:
an at least partly transparent display panel;
the biometric imaging arrangement according to claim 1, and
processing circuitry configured to:
receive a signal from the biometric imaging arrangement indicative of a fingerprint of a finger touching the transparent display panel,
perform a fingerprint authentication procedure based on the detected fingerprint.

15. The electronic device according to claim 14, wherein the electronic device is a mobile device.

16. A method for authenticating a user of an electronic device including a biometric imaging arrangement having a photodetector pixel array including at least a first portion of pixels arranged to receive light transmitted from an infrared cut-off filter with a spectral transmission band including the entire range of visible light and at least a second portion of pixels arranged to receive light transmitted from through at least one opening in the infrared cut-off filter, the light received by the second portion of pixels including visible light, the method comprising:
acquiring, using the biometric imaging arrangement, more than one image of an object during illumination of the object with visible light,
performing user authentication at least partly based on a time evolution of a comparison between an intensity of visible light received by the first portion of pixels and an intensity of visible light received by the second portion of pixels in the acquired images, and
concluding whether an object in the images is a spoof biometric object or a live biometric object based on an outcome of the comparison.

17. The method according to claim 16, wherein the comparison is a ratio between the intensity of light received by the first portion of pixels and the intensity of light received by the second portion of pixels.

18. The method according to claim 17, wherein the ratio is compared to a threshold value to conclude whether an object in the images is a spoof biometric object or a live biometric object.

19. The method according to claim 16, comprising:
illuminating the object with light in at least one predetermined spectral band during acquisition of the images.

20. The method according to claim 19, wherein the at least one predetermined spectral band include at least one of blue light, and red light, and green light, and infrared light.

21. The method according to claim 19, wherein the at least one predetermined spectral band includes at least part of a spectral band rejected by the infrared cut-off filter.

22. One or more processors configured to perform the steps of claim 16.

23. A computer program product comprising a non-transitory computer readable medium having stored thereon a computer program for authenticating a user of an electronic device including a biometric imaging arrangement having a photodetector pixel array including at least a first portion of pixels arranged to receive light transmitted from an infrared cut-off filter with a spectral transmission band including the entire range of visible light and at least a second portion of pixels arranged to receive light transmitted through at least one opening in the infrared cut-off filter, the light received by the second portion of pixels including visible light, wherein the computer program product comprises:
code for analyzing a time evolution of a comparison between an intensity of visible light received by the first portion of pixels and an intensity of visible light received by the second portion of pixels, in more than one image of an object acquired by the biometric imaging arrangement during illumination of the object with visible light, and
code for performing user authentication at least partly based on an outcome of the time evolution of the comparison.

24. The computer program product of claim 23, further comprising code for concluding whether an object in the images is a spoof biometric object or a live biometric object based on the outcome of the comparison.

* * * * *